(12) United States Patent
Park

(10) Patent No.: US 11,531,429 B2
(45) Date of Patent: Dec. 20, 2022

(54) TOUCH SENSING DEVICE WITH A CIRCULAR DISPLAY AND METHOD OF DETECTING TOUCH COORDINATES THEREOF

(71) Applicant: Silicon Works Co., Ltd., Daejeon (KR)

(72) Inventor: Se Jeong Park, Daejeon (KR)

(73) Assignee: Silicon Works Co., Ltd.

( * ) Notice: Subject to any disclaimer, the term of this patent is extended or adjusted under 35 U.S.C. 154(b) by 0 days.

(21) Appl. No.: 17/194,794

(22) Filed: Mar. 8, 2021

(65) Prior Publication Data

US 2021/0286498 A1  Sep. 16, 2021

(30) Foreign Application Priority Data

Mar. 11, 2020 (KR) .................. 10-2020-0029983

(51) Int. Cl.
*G06F 3/041* (2006.01)

(52) U.S. Cl.
CPC ................ *G06F 3/04186* (2019.05)

(58) Field of Classification Search
CPC .................................................. G06F 3/04186
See application file for complete search history.

(56) References Cited

U.S. PATENT DOCUMENTS

| | | | | |
|---|---|---|---|---|
| 2007/0008298 A1* | 1/2007 | Ohta | ...................... | A63F 13/214 345/173 |
| 2012/0146931 A1* | 6/2012 | Iida | ...................... | G06F 3/04186 345/173 |
| 2014/0160043 A1* | 6/2014 | Hwang | .................. | G06F 3/0418 345/173 |
| 2014/0168171 A1* | 6/2014 | Oh | ........................ | G06F 3/04186 345/178 |
| 2015/0199069 A1* | 7/2015 | Chiu | ...................... | G06F 3/0418 345/178 |
| 2019/0369835 A1* | 12/2019 | Chen | ....................... | G04G 21/08 |

FOREIGN PATENT DOCUMENTS

| | | |
|---|---|---|
| KR | 2014-0052482 B1 | 5/2014 |
| KR | 2014-0074561 B1 | 5/2014 |
| KR | 2014-0076957 A | 6/2014 |
| KR | 2015-0084639 A | 7/2015 |

* cited by examiner

*Primary Examiner* — Chun-Nan Lin
(74) *Attorney, Agent, or Firm* — Polsinelli PC

(57) ABSTRACT

Disclosed is a method of detecting touch coordinates in a touch sensing device. The method of detecting touch coordinates may include calculating touch coordinates of a touch point, determining whether the touch coordinates need to be corrected, extending a first distance between reference coordinates and the touch coordinates to a second distance when the touch coordinates need to be corrected, and correcting the touch coordinates by using a value of the second distance.

18 Claims, 4 Drawing Sheets

TOUCH SENSING DEVICE WITH A CIRCULAR DISPLAY AND METHOD OF DETECTING TOUCH COORDINATES THEREOF

BACKGROUND

1. Technical Field

The present disclosure relates to a touch sensing device and a method of detecting touch coordinates thereof, and more particularly, to a technology capable of accurately detecting touch coordinates for an edge area of a display.

2. Related Art

In general, a user interface enables a user to easily control an electronic device. The user interface technology continues to evolve into higher user sensitivity and manipulation convenience. Recently, a touch user interface is also extended and applied to a wearable electronic product having a circular display.

However, a touch sensing device applied to the circular display may experience a sensitivity shortage phenomenon for a touch input in an edge area of the circular display. For this reason, the accuracy of touch coordinates detected in the touch sensing device may be reduced.

Accordingly, there is a need for a technology capable of accurately detecting touch coordinates for an edge area of a circular display.

SUMMARY

Various embodiments are directed to providing a touch sensing device capable of accurately detecting touch coordinates for an edge area of a display and a method of detecting touch coordinates thereof.

In an embodiment, a method of detecting touch coordinates in a touch sensing device may include calculating touch coordinates of a touch point, determining whether the touch coordinates need to be corrected, extending a first distance between reference coordinates and the touch coordinates to a second distance when the touch coordinates need to be corrected, and correcting the touch coordinates by using a value of the second distance.

In an embodiment, a touch sensing device may include a read-out circuit configured to read charges from a touch sensing panel and output data corresponding to the read charges, and a controller configured to calculate touch coordinates by using the data, determine whether the touch coordinates need to be corrected, extend a first distance between reference coordinates and the touch coordinates to a second distance when the touch coordinates need to be corrected, and correct the touch coordinates by using a value of the second distance.

According to embodiments, if touch coordinates of a touch point correspond to an area that requires a correction, touch coordinates for an edge area can be accurately detected by correcting the touch coordinates based on an extended distance between reference coordinates and the touch coordinates.

DETAILED DESCRIPTION

Embodiments may provide a touch sensing device capable of accurately detecting touch coordinates for an edge area of a display and a method of detecting touch coordinates thereof.

In embodiments, reference coordinates may be set as center coordinates of a circle. A reference distance may be set as the radius of a circle.

In embodiments, reference coordinates may be set for each area that requires a coordinate correction in a touch sensing panel.

Embodiments illustrate that they are applied to a circular display adopting a touch sensing panel. In this case, reference coordinates may be set as center coordinates of a circle corresponding to a plane shape of the circular display.

Furthermore, embodiments are not limited to a circular display. For example, embodiments may be applied to a display having edge areas formed of a plurality of curves. In this case, reference coordinates may be set for each of a plurality of curves.

Figure 1:
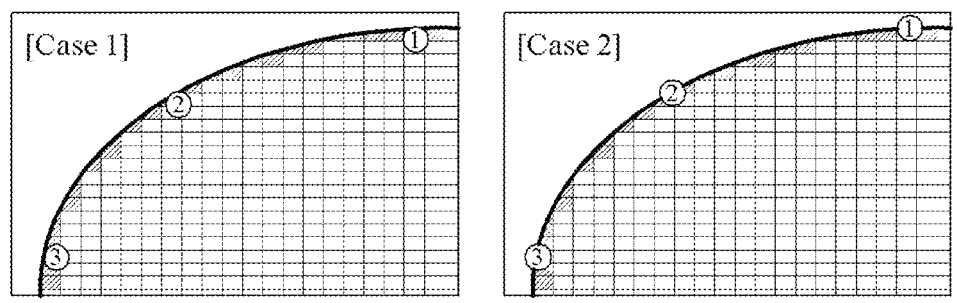
FIG. 1 is a diagram illustrating a touch to an edge area of a circular display.

FIG. 1 is a diagram illustrating a touch to an edge area of a circular display.

In FIG. 1, ①, ② and ③ indicate touch points. Furthermore, a rectangular unit cell may be understood as a touch sensor. The touch sensor will be described later in detail.

As illustrated in FIG. 1, in a touch sensing panel applied to the circular display, a touch point in the edge area may be detected with insufficient sensitivity depending on a ratio of a sensing location and a sensing area. That is, a sensitivity shortage phenomenon may occur.

In FIG. 1, Case 1 illustrates a case where an edge of a touch point comes into contact with an edge of the touch sensing panel. In the case of Case 1, the sensitivity for a touch point may occur in proportion to a sensing area. The accuracy of touch coordinates having the same performance as the center of a circle needs to be secured, but in view of an edge area characteristic, a sensitivity shortage phenomenon may occur because a ratio of the sensing area to the touch point is low.

Case 2 illustrates a case where the center of a touch point is located at an edge of the touch sensing panel. In the case of Case 2, the sensitivity for the touch point may be lower than that of Case 1 due to insufficient sensitivity for an edge area of the touch sensing panel and an insufficient sensing area. Furthermore, the accuracy of touch coordinates may be reduced due to a coordinate bias toward the center of a circle.

Embodiments are intended to provide a touch sensing device capable of accurately detecting touch coordinates although a touch point is located as in Cases 1 and 2 and a method of detecting touch coordinates thereof.

In describing the present disclosure, a detailed description of a related known function or configuration will be omitted if it is deemed to make the subject matter of the present disclosure unnecessarily vague. Furthermore, terms, such as first and second described in the specification, are not limited thereto, and are used to only distinguish one element from the other element.

Figure 2:
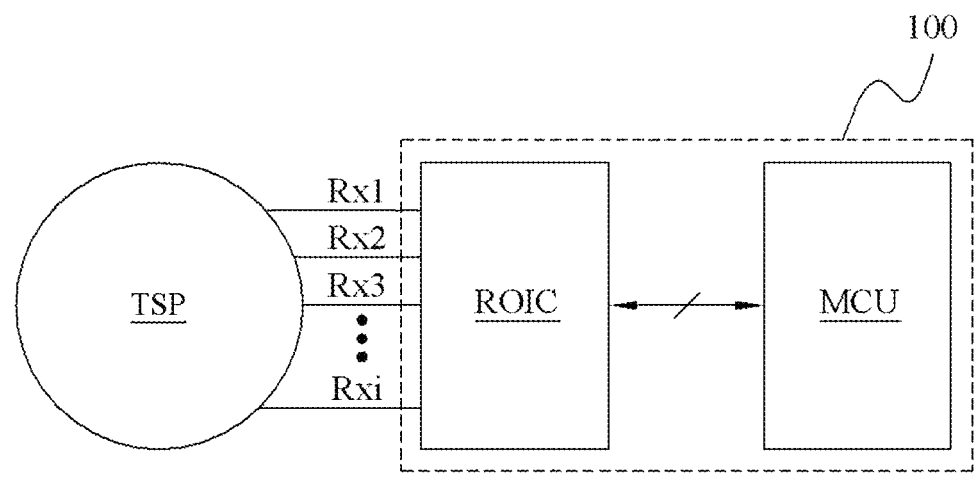
FIG. 2 is a block diagram of a touch sensing device according to an embodiment.

FIG. 2 is a block diagram of a touch sensing device 100 according to an embodiment.

Referring to FIG. 2, the touch sensing device 100 may include a read-out circuit ROIC and a controller MCU. For example, the touch sensing device 100 may be applied to a circular display.

A touch sensing panel TSP may be adopted on a circular display panel. The touch sensing panel TSP may be implemented to sense a touch input in a capacitive manner. For example, the touch sensing panel TSP may include driving lines (not illustrated) and read lines Rx1 to Rxi that intersect the driving lines. Touch sensors may be disposed at areas where the driving lines and the read lines Rx1 to Rxi intersect. The touch sensors may be understood as elements equivalently formed between the driving lines and the read lines to have preset capacitance. Furthermore, the touch sensors may be understood as forming touch sensing areas of unit areas on the basis of locations where the driving lines and the read lines Rx1 to Rxi intersect. In this case, the touch sensing areas may be understood as corresponding to the unit cells of FIG. 1.

The read-out circuit ROIC reads charges from the touch sensing panel TSP, and may provide the controller MCU with data corresponding to the charges. For example, the read-out circuit ROIC may select read lines through which charges according to capacitance of a touch sensor will be received in response to a driving signal from the controller MCU.

The read-out circuit ROIC may read, through the read lines, charges according to capacitance of a touch sensor selected in synchronization with the driving signal.

Furthermore, the read-out circuit ROIC may sample the received charges, may accumulate the sampled charges in the capacitor of an integrator, and may covert a voltage of the capacitor into digital data by using an analog-to-digital converter. The read-out circuit ROIC may provide the data to the controller MCU.

The controller MCU may calculate touch coordinates corresponding to a touch point based on data received from the read-out circuit ROIC.

The controller MCU may determine whether the touch coordinates are coordinates that need to be corrected. For example, if the controller MCU determines whether touch coordinates are coordinates that need to be corrected, the controller MCU may calculate a first distance between the touch coordinates and the center of a circle of a circular display, and may determine that the touch coordinates are coordinates that need to be corrected, when a value of the first distance is within a reference range.

In this case, the reference range may be defined as a range in which the touch coordinates need to be corrected in the touch sensing panel. The reference range may be set as a range from a value, obtained by subtracting a given multiple of a touch sensor size from the radius of the circle, to the radius of the circle. In this case, the touch sensor size may be understood as the touch sensing area. For example, a reference range may be set as a range from a value, obtained by subtracting 1.5 times of a touch sensor size from the radius of a circle, to the radius of the circle.

Furthermore, if the touch coordinates need to be corrected, the controller MCU may extend the first distance between the center of the circle and the touch coordinates to a second distance. If the first distance between the center of the circle and the touch coordinates is extended to the second distance, the controller MCU may determine a division section to which a value of the first distance belongs among division sections, and may calculate the value of the first distance as a value of the second distance by using an equation corresponding to the division section to which the value of the first distance belongs.

In this case, the division sections may be defined by dividing, into multiple sections, a reference range defined as a range in which touch coordinates need to be corrected in the touch sensing panel. An equation set in each of the division sections may be set to extend from the first distance to the second distance at a greater slope as a corresponding section becomes closer to the radius of the circle.

The controller MCU may correct the touch coordinates by using a value of the second distance extended from the first distance between the center of the circle and the touch coordinates. If the touch coordinates are corrected, the controller MCU may obtain corrected touch coordinates by substituting values of the touch coordinates with the value of the second distance and trigonometrical functions and substituting the trigonometrical functions with the values of the touch coordinates and the value of the first distance.

Furthermore, a coordinate value of the center of the circle may be set for each area that requires a coordinate correction in the touch sensing panel. For example, the coordinate value of the center of the circle may be used to calculate a distance from the center of the circle to the touch coordinates, and may be used to correct the touch coordinates. The coordinate value of the center of the circle may be differently set every multiple edge areas having multiple curves.

The touch sensing device 100 may further include a driving circuit although the driving circuit is not illustrated.

The driving circuit may select driving lines in response to a control signal of the controller, and may supply a driving signal to the selected driving lines. The driving circuit may apply driving signals to touch sensors, respectively, several times through the driving lines so that charges of the touch sensors are accumulated in the integrator of the read-out circuit. When the charges of the touch sensors are accumulated in the integrator of the read-out circuit, sensing sensitivity can be improved because a change in charges before and after a touch input may become great.

Figure 3:
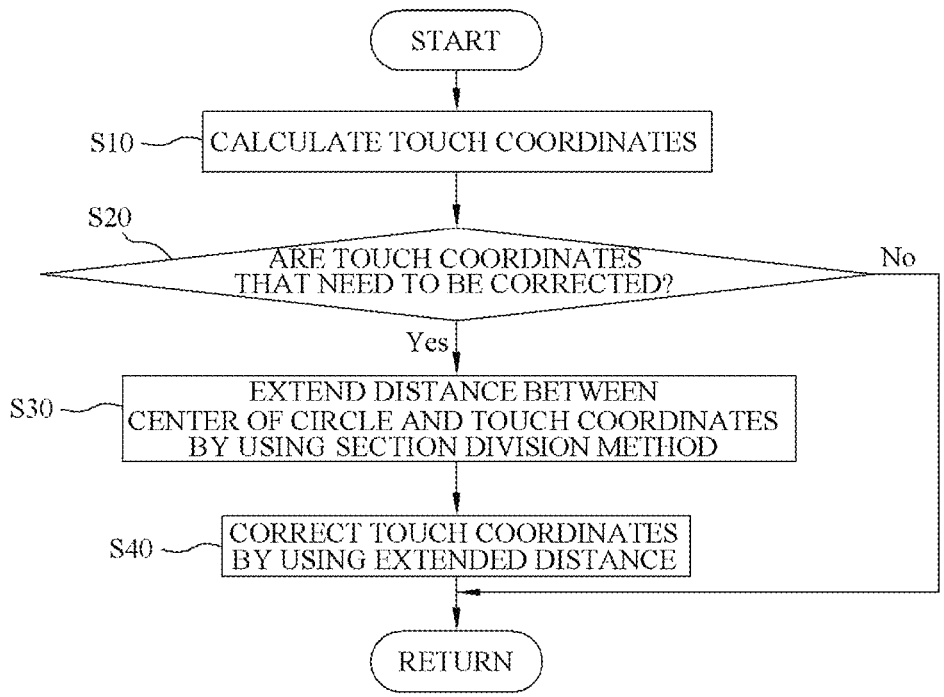
FIG. 3 is a flowchart illustrating a method of detecting, by the touch sensing device, touch coordinates according to an embodiment.

FIG. 3 is a flowchart illustrating a method of detecting, by the touch sensing device, touch coordinates according to an embodiment.

Referring to FIG. 3, the touch sensing device 100 may calculate touch coordinates of a touch point (S10).

Next, the touch sensing device 100 may determine whether the touch coordinates are coordinates that need to be corrected (S20). In order to determine whether the touch coordinates are coordinates that need to be corrected, the touch sensing device 100 may calculate a first distance between the center of a circle and the touch coordinates, and may determine that the touch coordinates are coordinates that need to be corrected, when a value of the first distance is within a reference range in which the touch coordinates need to be corrected.

If it is determined that the touch coordinates are coordinates that need to be corrected, the touch sensing device 100 may extend the first distance between the center of the circle and the touch coordinates to a second distance (S30). When extending the first distance between the center of the circle and the touch coordinates to the second distance, the touch sensing device 100 may determine a division section to which the value of the first distance belongs among preset division sections, and may calculate the value of the first distance as a value of the second distance by using an equation corresponding to the division section to which the value of the first distance belongs.

The touch sensing device 100 may extend the first distance between the center of the circle and the touch coordinates to the second distance by using an equation set for each of the division sections. For example, the equation set for each of the division sections may be set to extend the first distance to the second distance at a greater slope as a corresponding section becomes closer to the radius of the circle. Maximum coordinates of an edge of a circular display may correspond to a location where a distance between the edge and the center of the circle is a radius. A distance between current touch coordinates and the center of the circle may be calculated. If the calculated distance corresponds to a section where the touch coordinates need to be corrected, the distance between the edge and the center of the circle may be proportionally extended.

Next, the touch sensing device 100 may correct the touch coordinates by using the value of the second distance extended from the first distance between the center of the circle and the touch coordinates (S40). When the touch coordinates are corrected using the value of the second distance, the touch sensing device 100 may substitute values of the touch coordinates with the value of the second distance and trigonometrical functions. In this case, the touch sensing device 100 may calculate values of the touch coordinates by substituting the trigonometrical functions with the values of the touch coordinates and the value of the first distance.

Figure 4:
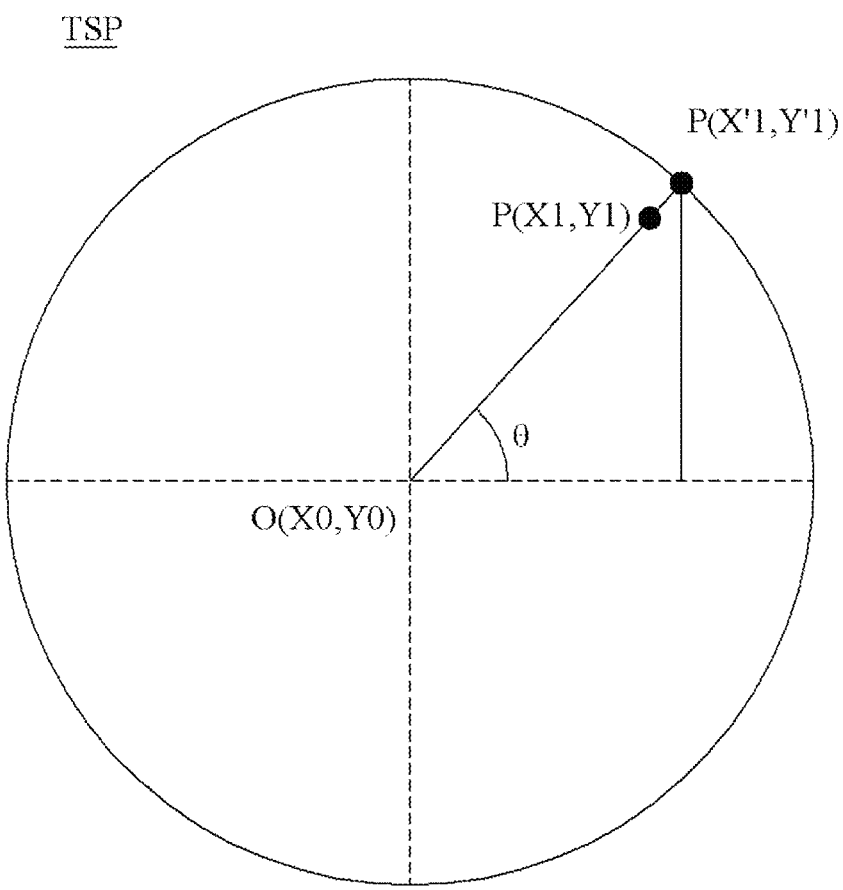
FIG. 4 is a diagram for describing a correction to touch coordinates according to an embodiment.

FIG. 4 is a diagram for describing a correction to touch coordinates according to an embodiment.

In FIG. 4, coordinates of the center of a circle are indicated as O(X0, Y0), touch coordinates are indicated as P(X1, Y1), and corrected touch coordinates are indicated as P(X'1, Y'1).

In an embodiment, the touch coordinates P(X1, Y1) may be corrected using a value of a second distance, extended from a first distance between the center of the circle and the touch coordinates, and trigonometrical functions.

$$X'1 = \cos\theta * X'1Y'1\_distance + X0$$

$$Y'1 = \sin\theta * X'1Y'1\_distance + Y0$$

$$\cos\theta = (X1 - X0)/X1Y1\_distance$$

$$\sin\theta = (Y1 - Y0)/X1Y1\_distance \quad (1)$$

In Equation 1, X1Y1_distance represents a straight-line distance between the center O(X0, Y0) of the circle and the touch coordinates P(X1, Y1). X'1Y'1_distance represents an extended distance.

As in Equation 1, the values of the touch coordinates may be substituted with the trigonometrical functions by using the value of the second distance. The trigonometrical functions may be substituted with the values of the touch coordinates and the value of the first distance. As described above, the values of the corrected touch coordinates may be calculated using the trigonometrical functions and the value of the second distance extended from the first distance between the center of the circle and the touch coordinates.

Figure 5:
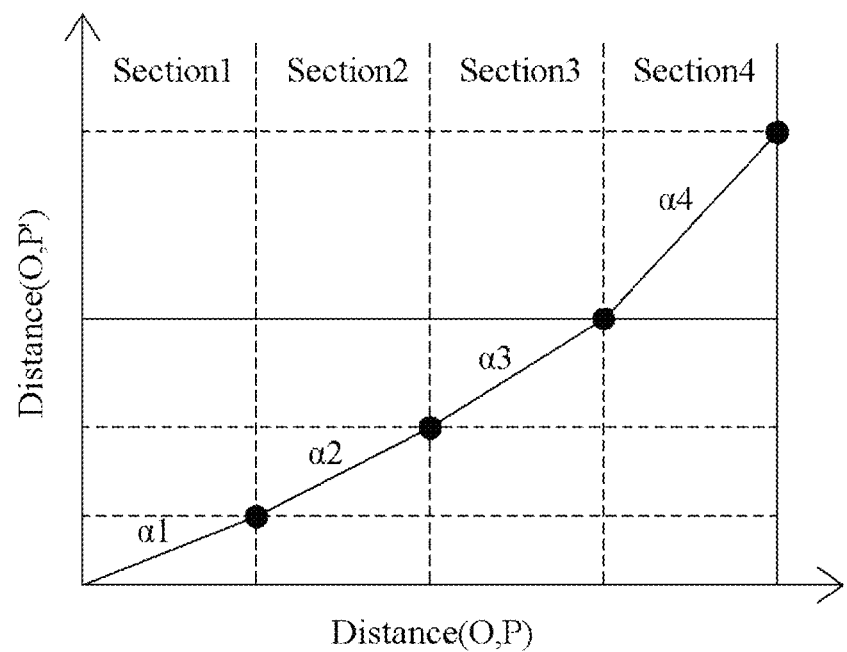
FIG. 5 is a graph for describing the extension of a distance between the center of a circle and touch coordinates according to an embodiment.

FIG. 5 is a graph for describing the extension of a distance between the center of a circle and touch coordinates according to an embodiment.

Referring to FIG. 5, in an embodiment, when a first distance between the center of a circle and touch coordinates is extended to a second distance, a division section to which a value of the first distance belongs among division sections Section1 to Section4 may be determined. The value of the first distance may be extended as a value of the second distance by using an equation corresponding to the division section to which the value of the first distance belongs.

For example, linear functions having different slopes a1 to a4 may be set in the division sections Section1 to Section4, respectively. Values of the slopes a1 to a4 may be set to become greater as a section becomes closer to the radius of a circle.

As described above, embodiments can accurately detect touch coordinates for an edge area because the touch coordinates of a touch point are corrected using an extended distance between reference coordinates and the touch coordinates if the touch coordinates correspond to an area that needs to be corrected.

What is claimed is:

1. A method of detecting touch coordinates in a touch sensing device, the method comprising:
   calculating touch coordinates of a touch point;
   determining that the touch are coordinates that need to be corrected, when a value of a first distance, which is between reference coordinates and the touch coordinates, is within a reference range;
   extending the first distance to a second distance when the touch coordinates need to be corrected; and
   correcting the touch coordinates by using a value of the second distance,
   wherein the touch coordinates are on a circular display,
   wherein the extending of the first distance to the second distance comprises:
      extending the first distance to the second distance by calculating the value of the first distance as the value of the second distance according to an equation corresponding to the value of the first distance,
   wherein the first distance is between the touch coordinates and the center of a circle of the circular display, and
   wherein the equation is set to extend the first distance to the second distance at a greater slope as the first distance becomes closer to a radius of the circle.

2. The method of claim 1, wherein the determining that the touch coordinates are coordinates that need to be corrected comprises:
   calculating the first distance between the touch coordinates and the center of the circle of the circular display; and
   determining that the touch coordinates are coordinates that need to be corrected, when the value of the first distance is within the reference range.

3. The method of claim 2, wherein the reference range is set as a range from a reference distance, indicative of a distance preset based on the reference coordinates, to a value obtained by subtracting a given multiple of a touch sensor size from the reference distance.

4. The method of claim 3, wherein:
   the reference coordinates are set as center coordinates of the circle, and
   the reference distance is set as the radius of the circle.

5. The method of claim 1, wherein the extending of the first distance to the second distance comprises:
   determining a division section to which the value of the first distance belongs among division sections of the reference range; and
   calculating the value of the first distance as the value of the second distance by using the equation corresponding to the division section to which the value of the first distance belongs.

6. The method of claim 5, wherein the division sections are set by dividing, into multiple sections, the reference range indicative of a range in which a correction is necessary in a touch sensing panel.

7. The method of claim 5, wherein the equation set for each of the division sections is set to extend the first distance to the second distance at a greater slope as the division section becomes closer to a reference distance indicative of a distance preset based on the reference coordinates.

8. The method of claim 1, wherein the correcting of the touch coordinates comprises obtaining the corrected touch coordinates by substituting values of the touch coordinates with the value of the second distance and trigonometrical functions and substituting the trigonometrical functions with the values of the touch coordinates and the value of the first distance.

9. The method of claim 1, wherein the reference coordinates are set for each area that requires a coordinate correction in the touch sensing panel.

10. A touch sensing device comprising:
a read-out circuit configured to read charges from a touch sensing panel and output data corresponding to the read charges; and
a controller configured to:
calculate touch coordinates by using the data,
determine that the touch coordinates are coordinates that need to be corrected, when a value of a first distance, which is between reference coordinates and the touch coordinates, is within a reference range,
extend the first distance to a second distance when the touch coordinates need to be corrected, and
correct the touch coordinates by using a value of the second distance,
wherein the touch coordinates are on a circular display,
wherein the controller configured to extend the first distance to the second distance by calculating the value of the first distance as the value of the second distance according to an equation corresponding to the value of the first distance,
wherein the first distance is between the touch coordinates and the center of a circle of the circular display, and
wherein the equation is set to extend the first distance to the second distance at a greater slope as the first distance becomes closer to a radius of the circle.

11. The touch sensing device of claim 10, wherein when it is determined that the touch coordinates are coordinates that need to be corrected, the controller calculates the first distance between the touch coordinates and the center of the circle of the circular display, and determines that the touch coordinates are coordinates that need to be corrected, when the value of the first distance is within the reference range.

12. The touch sensing device of claim 11, wherein the reference range is set as a range from a reference distance, indicative of a distance preset based on the reference coordinates, to a value obtained by subtracting a given multiple of a touch sensor size from the reference distance.

13. The touch sensing device of claim 12, wherein:
the reference coordinates are set as center coordinates of the circle, and
the reference distance is set as the radius of the circle.

14. The touch sensing device of claim 10, wherein if the first distance between the reference coordinates and the touch coordinates is extended to the second distance, the controller determines a division section to which the value of the first distance belongs among division sections of the reference range, and calculates the value of the first distance as the value of the second distance by using the equation corresponding to the division section to which the value of the first distance belongs.

15. The touch sensing device of claim 14, wherein the division sections are set by dividing, into multiple sections, the reference range indicative of a range in which a correction is necessary in a touch sensing panel.

16. The touch sensing device of claim 14, wherein the equation set for each of the division sections is set to extend the first distance to the second distance at a greater slope as the division section becomes closer to a reference distance indicative of a distance preset based on the reference coordinates.

17. The touch sensing device of claim 10, wherein if the touch coordinates are corrected, the controller calculates the corrected touch coordinates by substituting values of the touch coordinates with the value of the second distance and trigonometrical functions and substituting the trigonometrical functions with the values of the touch coordinates and the value of the first distance.

18. The touch sensing device of claim 10, wherein the reference coordinates are set for each area that requires a coordinate correction in the touch sensing panel.

* * * * *